(12) United States Patent
Yaniv et al.

(10) Patent No.: US 6,233,642 B1
(45) Date of Patent: May 15, 2001

(54) METHOD OF WIRING A 64-BIT ROTATOR TO MINIMIZE AREA AND MAXIMIZE PERFORMANCE

(75) Inventors: Elan Tsvi Yaniv, Austin, TX (US); David James Martens, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/229,101

(22) Filed: Jan. 14, 1999

(51) Int. Cl.[7] ................................................ G06F 13/00
(52) U.S. Cl. .......................... 710/131; 710/65; 712/204
(58) Field of Search ............................ 710/65, 131, 132; 712/204, 206

(56) References Cited

U.S. PATENT DOCUMENTS

| | | | |
|---|---|---|---|
| 4,937,775 | * | 6/1990 | Engeler et al. .................. 708/422 |
| 5,410,677 | * | 4/1995 | Roskowski et al. .............. 710/65 |
| 5,581,718 | * | 12/1996 | Grochowski ..................... 712/204 |
| 5,604,498 | * | 2/1997 | Park ............................ 341/65 |
| 5,764,165 | * | 6/1998 | Buch ............................ 341/53 |
| 5,845,100 | * | 12/1998 | Gupta et al. .................... 712/204 |
| 6,112,018 | * | 8/2000 | Tran et al. ..................... 712/202 |

OTHER PUBLICATIONS

"Method forImplementing a Customized DCVS Circuit Design for an N–Bit Rotator"; IBM Technical Disclosure Bulletin, Jun. 1, 1988; US; vol. 31, No. 1; pp. 303–307, Jun. 1988.*

* cited by examiner

*Primary Examiner*—Xuan M. Thai
(74) *Attorney, Agent, or Firm*—Anthony V. S. England; Felsman, Bradley, Vaden, Gunter & Dillon, LLP

(57) ABSTRACT

Each bitslice multiplexing structure of a rotator circuit is configured as a plurality of first stage 8:1 multiplexers each receiving eight of the rotator circuits as inputs and one second-stage 8:1 multiplexer receiving the outputs of the first-stage multiplexers are inputs. To achieve the desired functionality with a single set of shift input signals, the rotator inputs to the first-stage multiplexers are changed for different bitslice multiplexing structures within the rotator, and the connection of the first-stage multiplexer outputs to the second-stage multiplexer inputs are changed for different groups of bitslice multiplexing structures. The first-stage multiplexers are positioned between two input buses running across the entire width of the rotator circuit. Any input of the first-stage multiplexer may be connected a input signal conductor within the input buses above or below the first-stage multiplexer, and the input buses and the first-stage multiplexers are distributed on opposite sides of the second-stage multiplexer. This limits the number of wires required in one metallization level for the vertical direction to twelve at any horizontal cross-section of the bitslice multiplexing structure. The resulting rotator circuit has an improved aspect ratio, more efficient circuit area usage, and better overall circuit performance for performing rotate operations from 0 to 63 bits on 64-bit operands.

19 Claims, 11 Drawing Sheets

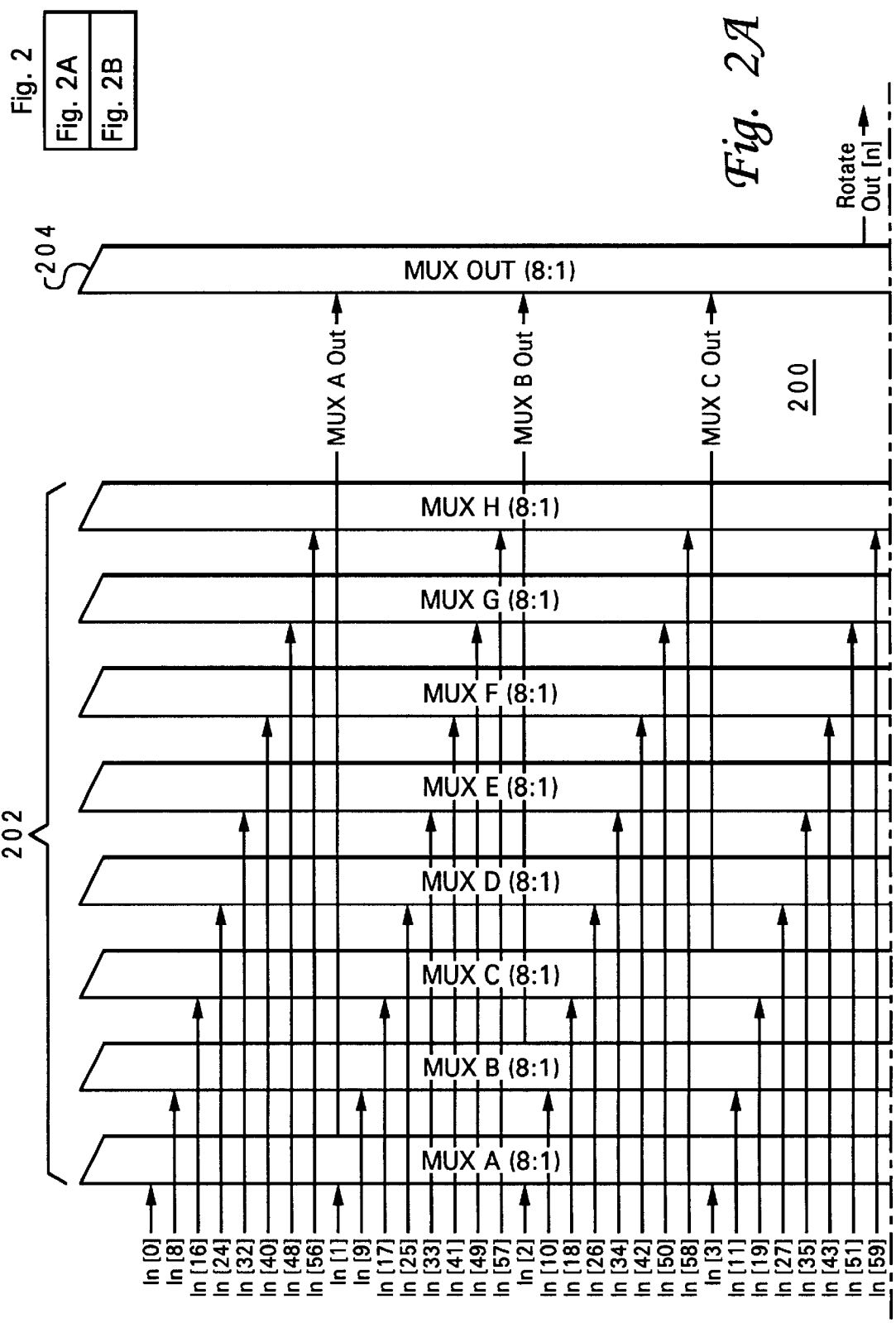

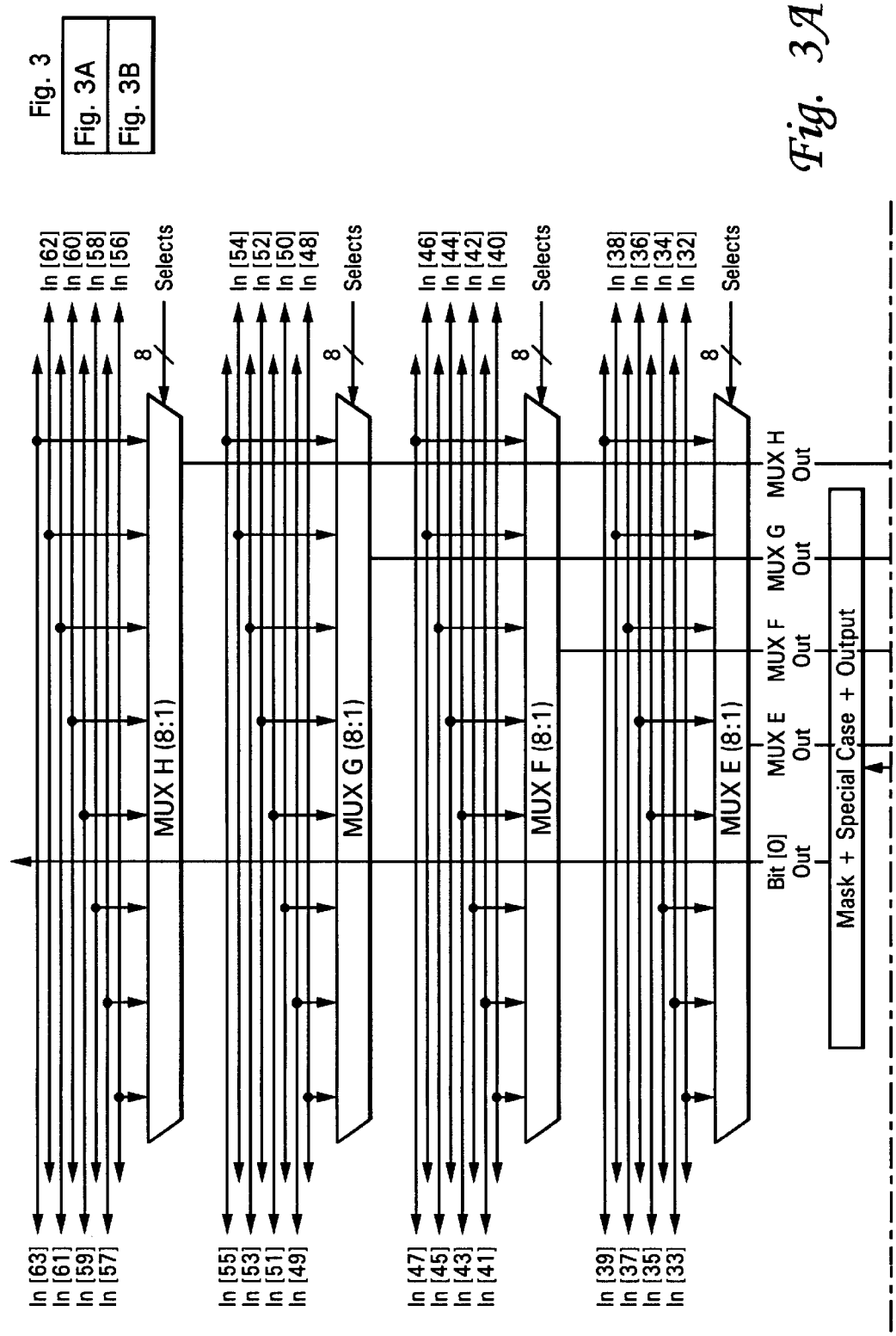

METHOD OF WIRING A 64-BIT ROTATOR TO MINIMIZE AREA AND MAXIMIZE PERFORMANCE

RELATED APPLICATIONS

The present invention is related to the subject matter of the following commonly assigned, copending U.S. patent application Ser. No. 09/229,100 entitled "64-Bit Rotator That Will Perform 32- and 64-Bit Rotations" and filed Jan. 14, 1999. The content of the above-referenced application is incorporated herein by reference.

BACKGROUND OF THE INVENTION

1. Technical Field

The present invention relates in general to rotator circuits in processors and in particular to wiring rotator circuits within a processor. Still more particularly, the present invention relates to minimizing the input routing required in wiring a 64-bit rotator circuit.

2. Description of the Related Art

Rotate operations are special cases of shift operations in which "end-around," the process of copying bits shifted off one end of an operand into the other end, is employed. A simple example of rotating a 64-bit operand is shown in the two lines below, with the operand given in the first line and the result given in the second:

01000011 00011111 01010011 00001110 10110111 01010101 01111101 01001011

01100011 11101010 01100001 11010110 11101010 10101111 10101001 01101000

The 64-bit operand in the first line has been rotated 5 positions to the left in the second line. Alternate bytes of the "before" operand have been italicized in both lines for emphasis.

In a 64-bit architecture, it is necessary to perform rotate operations which are from 0 to 63 bits in offset. Rotate operations are commonly performed by an array 502 of multiplexer circuits 504 as shown in FIG. 5. Each multiplexer 504 provides the shifting for a single bit position of the output, which requires that the full set of 64 input signals be routed to each multiplexer 504 in array 502 to accomplish a rotate of 0–63 positions. This large number of inputs presents significant wiring challenges in addition to obstacles to efficient use of circuit area.

The most straightforward method for wiring a 64-bit rotator is to route all 64 input to each simple multiplexer structure as shown in FIG. 5. The downside of this approach is that the entire rotator structure would be very short in the vertical dimension and very long in the horizontal dimension—an extremely poor aspect ratio—as a result of forming 64 side-by-side 64-input multiplexers. Additionally, it is impractical to build a circuit primitive providing the functionality of a 64-bit multiplexer utilizing only a single stage of circuitry.

It would be desirable, therefore, to provide a solution to the poor aspect ratio which a 64-bit rotator circuit would naturally tend to assume. It would further be advantageous for the solution to be consistent with use of multiple stage of circuitry for the functionality of a 64-input multiplexer.

SUMMARY OF THE INVENTION

It is therefore one object of the present invention to provide an improved rotator circuit for processors.

It is another object of the present invention to provide an improved method and system for wiring rotator circuits within a processor.

It is yet another object of the present invention to provide a method and system for minimizing the input routing required in wiring a 64-bit rotator circuit.

The foregoing objects are achieved as is now described. Each bitslice multiplexing structure of a rotator circuit is configured as a plurality of first stage 8:1 multiplexers each receiving eight of the rotator circuits as inputs and one second stage 8:1 multiplexer receiving the outputs of the first-stage multiplexers are inputs. To achieve the desired functionality with a single set of shift input signals, the rotator inputs to the first-stage multiplexers are changed for different bitslice multiplexing structures within the rotator, and the connection of the first-stage multiplexer outputs to the second-stage multiplexer inputs are changed for different groups of bitslice multiplexing structures. The first-stage multiplexers are positioned between two input buses running across the entire width of the rotator circuit. Any input of the first-stage multiplexer may be connected to an input signal conductor within the input buses above or below the first-stage multiplexer, and the input buses and the first-stage multiplexers are distributed on opposite sides of the second-stage multiplexer. This limits the number of wires required in one metallization level for the vertical direction to twelve at any horizontal cross-section of the bitslice multiplexing structure. The resulting rotator circuit has an improved aspect ratio, more efficient circuit area usage, and better overall circuit performance for performing rotate operations from 0 to 63 bits on 64-bit operands.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
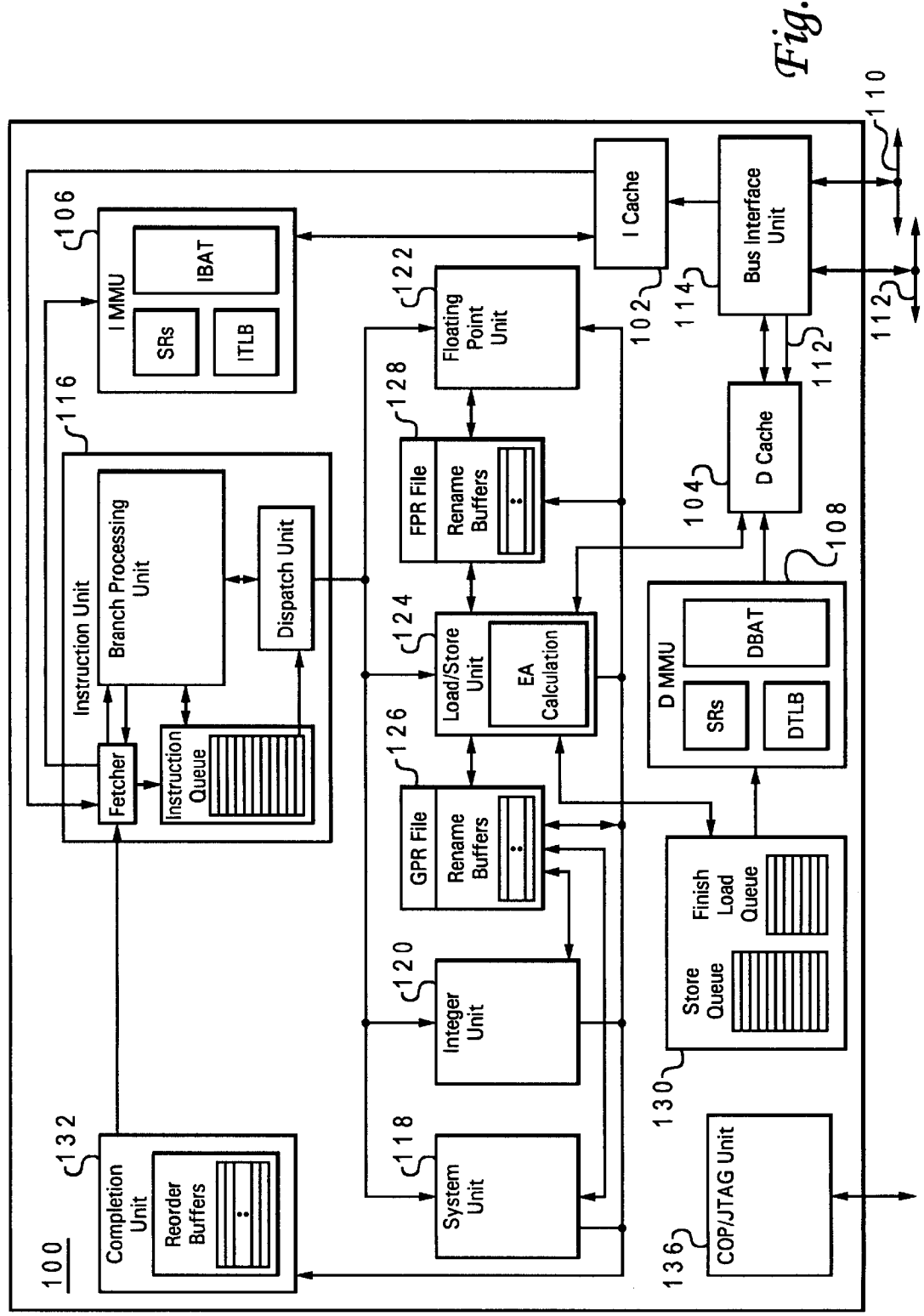
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar microprocessor, such as the PowerPC™ family of processors available from International Business Machines Corporation of Armonk, N.Y.

Accordingly, processor 100 includes various units, registers, buffers, memories, and other sections, all of which are formed by integrated circuitry. Processor 100 also operates according to reduced instruction set computing ("RISC") techniques.

Processor 100 includes level one (Li) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and a dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer or floating point registers 126 or 128 as needed, and stores instructions results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2B:
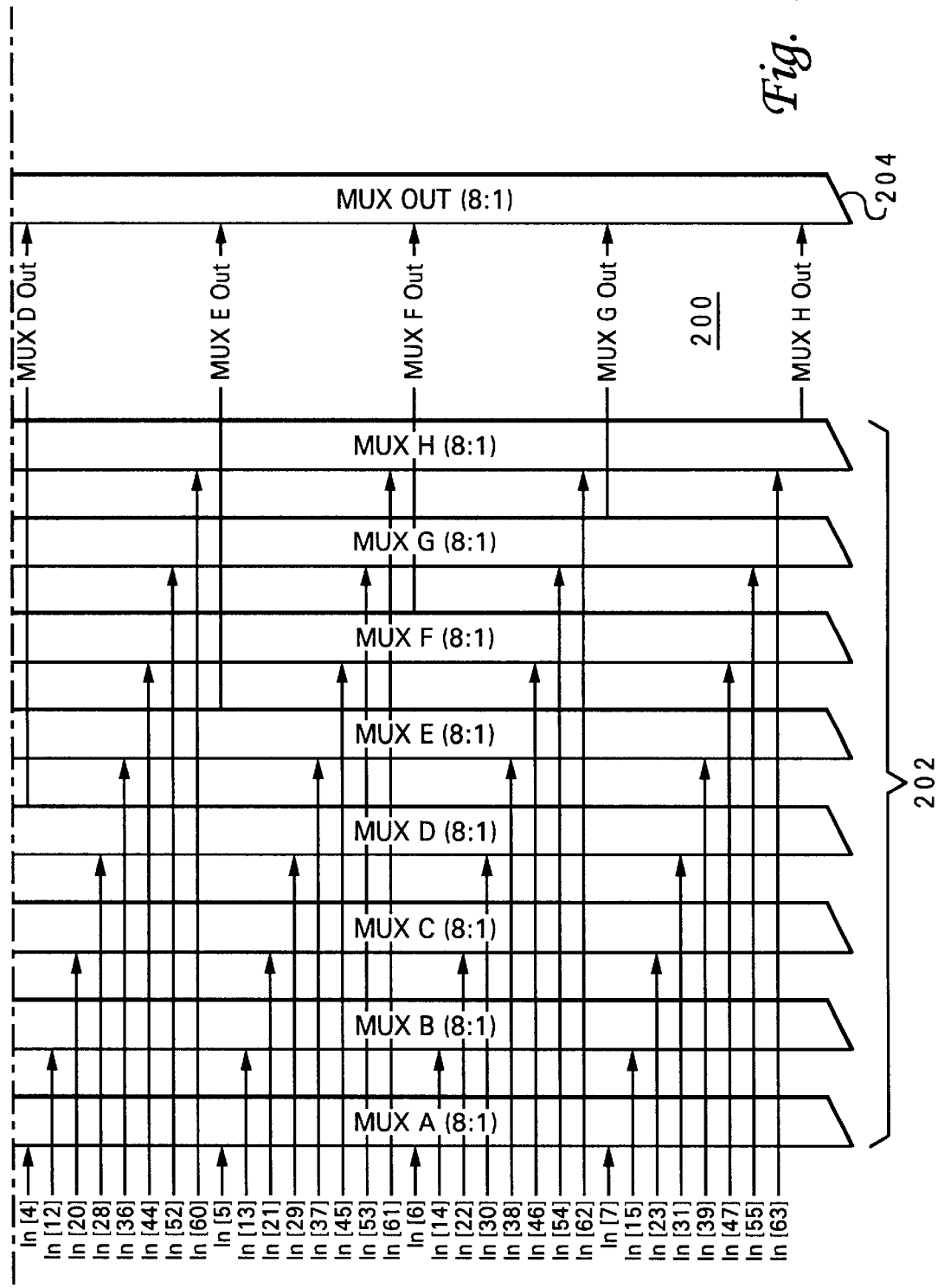
FIG. 2 is a block diagram of a multiplexer structure for a rotator circuit in accordance with a preferred embodiment of the present invention.

Referring now to FIG. 2, a block diagram of a multiplexer structure for a rotator circuit in accordance with a preferred embodiment of the present invention is illustrated. Multiplexing structure 200 may be implemented within an execution unit in processor 100 depicted in FIG. 1, such as integer unit 120. Multiplexing structure 200 illustrates the conceptual organization of multiplexers utilized to implement a 64:1 multiplexer function for bit [n] of the rotator. Sixty-four instances of the multiplexing structure illustrated in FIG. 2 are implemented to form the rotator, with individual variations described in further detail below.

Multiplexing structure 200 includes a first level 202 of eight-to-one multiplexers MUX A through MUX H, each receiving as inputs eight bits of the overall 64 inputs to the 64:1 multiplexing structure 200. MUX A receives inputs [0:7]; MUX B receives inputs [8:15]; MUX C receives inputs [16:23]; MUX D receives inputs [24:31]; MUX E receives inputs [32:39]; MUX F receives inputs [40:47]; MUX G receives inputs [48:55]; and MUX H receives inputs [56:63]. These eight groups of eight inputs each are utilized to create eight single bit, first-stage outputs, and the eight first-stage outputs are combined by a ninth 8:1 multiplexer 204 to form the overall result for bit [n] of the rotator.

The outputs of first level 8:1 multiplexers 202 are connected to the input of ninth 8:1 multiplexer 204, which forms a second level of multiplexing for multiplexing structure 200. Depending upon which input is to be shifted to the output as bit [n], the appropriate output of MUX A through MUX H is selected by MUX OUT 204. For instance, if bit [19] were to be shifted to bit [n] of the rotator output, input [19] would be selected by MUX C within first level multiplexers 202, and the output of MUX C would be selected by MUX OUT 204. In this manner, a 64:1 multiplexing function is implemented with a significantly improved aspect ratio.

While the concept illustrated in FIG. 2 provides an acceptable aspect ratio for a multiplexing structure, a total solution is lacking since the physical layout and wiring organization require 56 inputs (inputs [8:63]) to be wired over the circuit area of MUX A. Due to the limited number of metal planes available for use in wiring and the limited width of each bit within the 64-bit rotator, further changes to the layout are necessary. The key observation required for further improvement is that the locality of the wires is different for each of the first level multiplexers. In other words, MUX A only needs inputs [0:7] while MUX B only needs inputs [8:15}, etc. Therefore, the amount of wiring in the vicinity of MUX A may be limited to inputs [0:7] only.

Figure 3B:
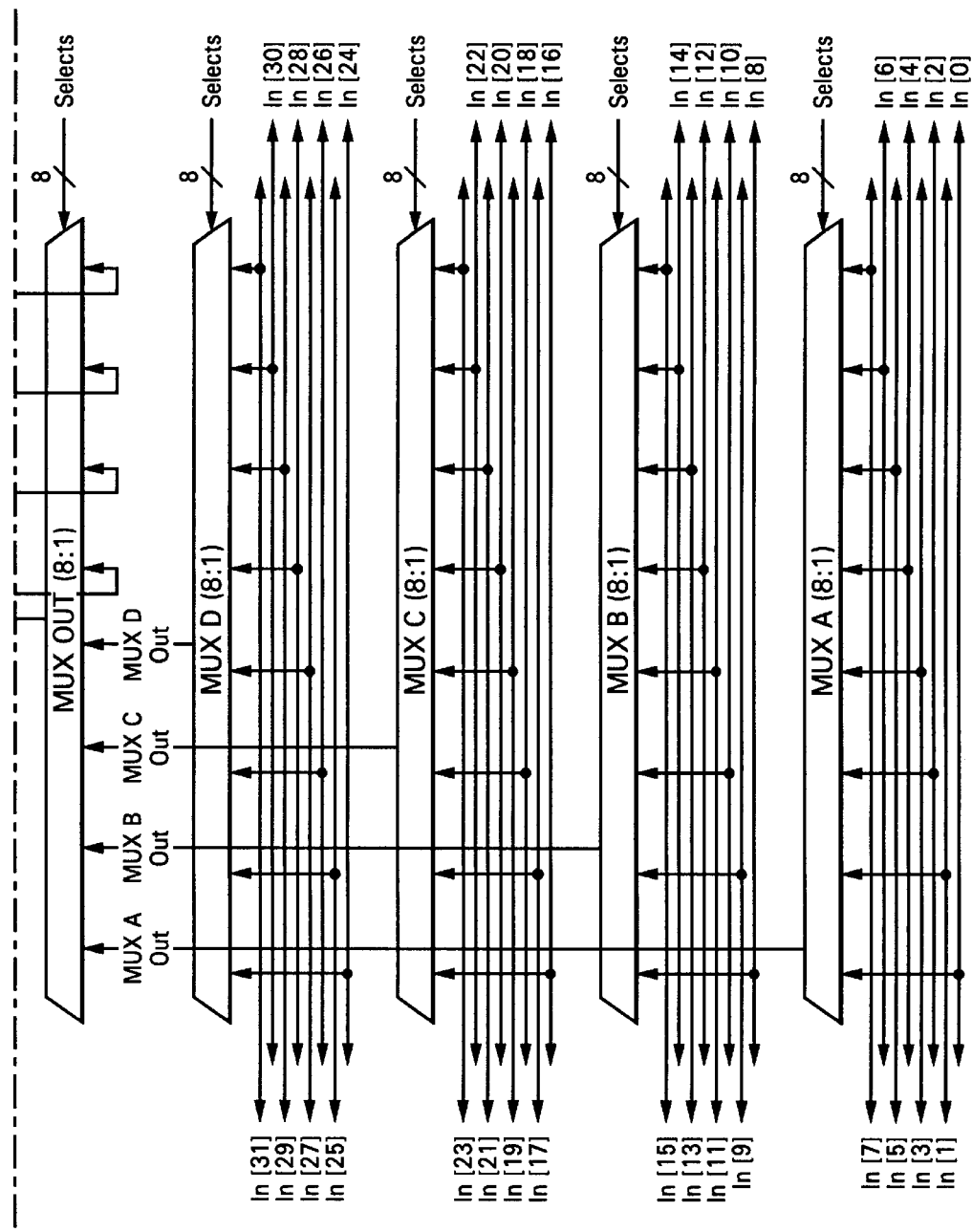
FIG. 3 depicts a wiring diagram of a rotator multiplexing structure layout for a single bitslice of a rotator circuit in accordance with a preferred embodiment of the present invention.

With reference now to FIG. 3, a wiring diagram of a rotator multiplexing structure layout for a single bitslice of a rotator circuit in accordance with a preferred embodiment of the present invention is depicted. FIG. 3 depicts the multiplexing structure layout for bit [0] of the rotator. First level multiplexers MUX A through MUX H are arranged adjacent to the inputs required for the respective multiplexers in order to generate bit [0], four above the second level multiplexer MUX OUT and four below. The input conductors run transversely with respect to the multiplexers MUX A through MUX H, formed by a first metallization level in between adjacent multiplexers.

The input conductors are tapped as necessary by a second metallization level for the respective multiplexer inputs, such that only eight input wires are necessary in the vertical direction (as depicted in FIG. 3) for each multiplexer, taken at any horizontal cross-section in the circuit. The outputs of the first level multiplexers are connected by the second metallization level to the inputs of the second level multiplexer, and the output of the rotator, connected to mask and special case circuits at the output of the second level multiplexer, is connected to other portions of the processor utilizing a fourth metallization level. In this design, a maximum of only twelve wires in the vertical direction, taken at any horizontal cross-section, is required for bit [0] of the rotator output. This maximum occurs adjacent to first level multiplexer MUX E in the embodiment depicted.

Sixty-four instances of the circuit depicted in FIG. 3 are required to implement a 64-bit rotator. However, one extra level of complication must be considered to produce the correct functional result for the remaining 63 instances of the multiplexing circuit shown, for bits [1:63] of the rotator output. This extra level of complication relates to selecting the correct input for the shifted output bit given the shift amount. For instance, rotator output bit [1] should reflect input bit [1] rather than input bit [0] when the shift amount for the rotator circuit is zero, while output bit [2] should reflect input bit [2] when the shift amount is zero, etc. Thus, the mechanism depicted in FIG. 3 must be adjusted for each output bit [1:63] to select the correct input.

Figure 4A:
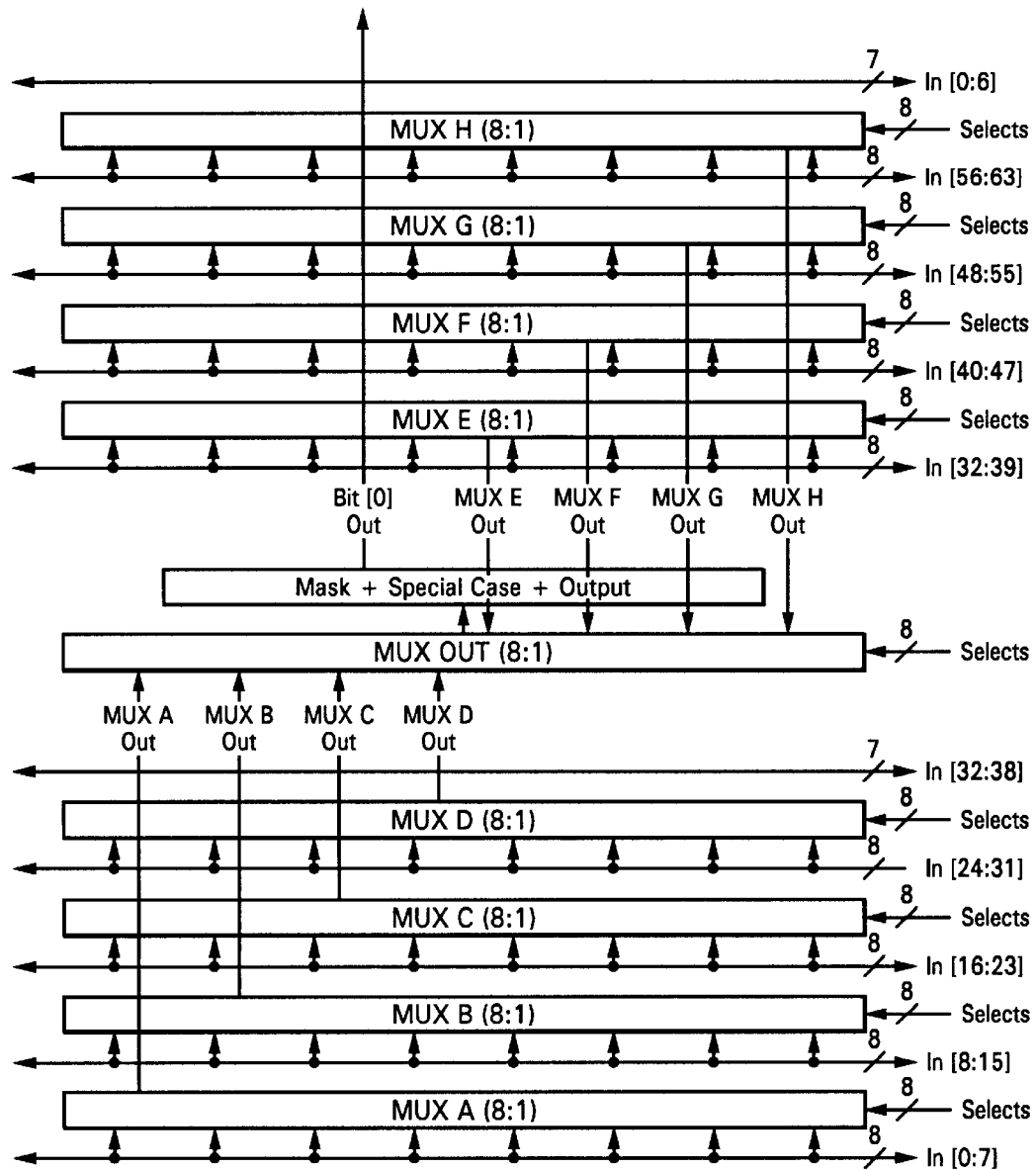
FIGS. 4A–4E are diagrams of a rotator circuit and component bitslice multiplexing structures in accordance with a preferred embodiment of the present invention.

Referring to FIGS. 4A–4E, diagrams of a rotator circuit and component bitslice multiplexing structures in accordance with a preferred embodiment of the present invention. FIG. 4A depicts a layout and wiring diagram for a single bitslice multiplexing structure within the rotator circuit. In order to maintain a maximum of twelve vertical wires at any horizontal cross-sectional point in the multiplexing structure, a slight modification from the layout of FIG. 3 is required, and two considerations regarding the individual multiplexer inputs must be satisfied.

Each first level multiplexer MUX A through MUX H may be assumed to select and output the left-most input (as depicted) of each multiplexer when the shift amount to the respective multiplexer is zero, while the right-most input is selected and output when the shift amount input to that multiplexer is 7, with the intervening inputs being sequentially selected in order as the input shift amount increases from 0 to 7. Thus, each first level multiplexer must have the inputs entering the respective multiplexer in the correct order to produce the correct sequence for a 64-bit rotate. The left-most input to MUX A for the multiplexing structure should reflect the input bit corresponding to the respective output bit for the rotator which is generated by the multiplexing structure. If the multiplexing structure instance drives bit [1] of the rotator output, then the left-most input to MUX A should be input bit [1].

Stated differently, the multiplexing circuits for bit position [0] of the rotator output should have the input enter the circuits (as shown) in the order [0:63]. For rotator output bit [1], the inputs should enter the instance of the 64-input multiplexing structure in the order [1:63,0]; for rotator output bit [2], the inputs should enter in the order [2:63, 0:1]; for rotator output bit [3], the entry order should be [3:63, 0:2]. The pattern extends to the last three output bit [61], [62], and [63], which should enter the corresponding multiplexing structures in the orders [61:63, 0:60], [62:63, 0:61], and [63, 0:63], respectively. Tables I–VIII in the Appendix detail the input connections for each first-stage multiplexer MUX A through MUX H.

By performing an input ordering translation on the way that wires are connected to the individual multiplexers within each of the 64 bitslice multiplexing structures for the rotator circuit, the correct functionality for the desired 64-bit rotate function may be achieved. However, the layout and wiring scheme shown in FIG. 3—in which groups of n input signal conductors are run transversely between adjacent pairs of n-input first level multiplexers— limits the availability of input wiring to each multiplexer. The layout and wiring scheme illustrated in FIG. 4A solves this problem by insuring that each first-stage multiplexer lies in between two groups of input signal conductors. Any multiplexer input may be connected to the eight input bits above the multiplexer and the eight input bits below the multiplexer.

If the first-stage multiplexers are connected to any input within an input bus which is immediately above or below that multiplexer, any multiplexer input may be connected to a maximum of 16 of the 64 total inputs. This allows rotator input [5] to be connected to input [5] of bitslice zero within the rotator, connected to input [4] of bitslice [1], connected to input [3] of bitslice [2], etc., to provide the proper functionality with changing the structure or layout of the multiplexer circuits for different bitslices. Fourteen input bus conductors, In [0:6] and In [32:38], should be duplicated, but this trade-off allows the maximum of twelve vertical wires at any horizontal point to be maintained.

Figure 4B:
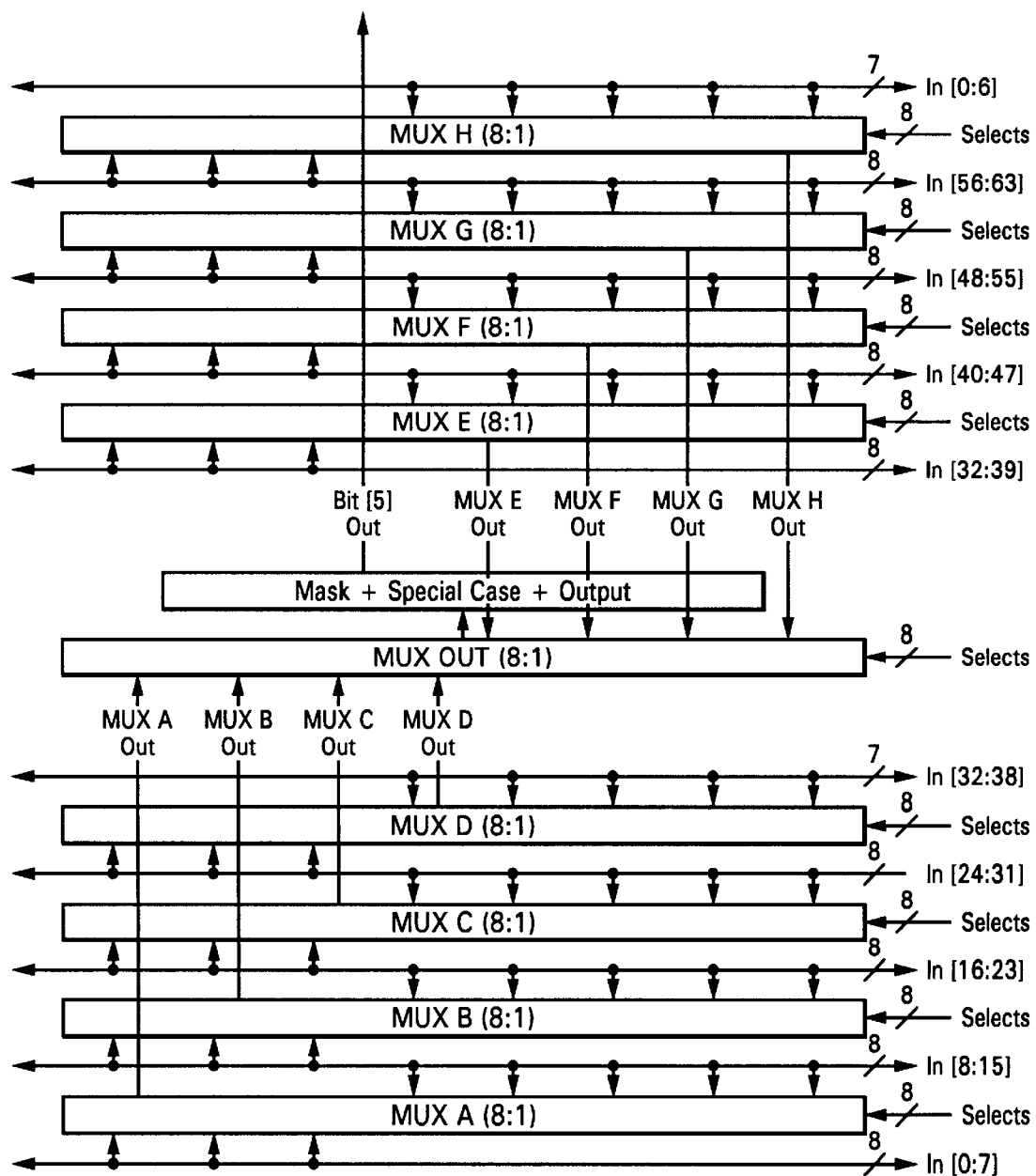

FIG. 4A illustrates the wiring of the bitslice multiplexing structure for rotator output bit [0]. For other bitslice multiplexing structures, the connection of individual first-stage multiplexer inputs is varied according to Tables I–VIII to achieve the desired functionality. FIG. 4B illustrates the layout and wiring of a bitslice multiplexing structure for rotator output bit [5]. In this bitslice, the first three inputs of each first-stage multiplexer MUX A through MUX H are connected to the input bus below the respective multiplexer, while the last five multiplexer inputs are connected to the input bus above that multiplexer. The inputs of MUX H, for example, are connected, from left-most to right-most, to In[60], In[61], In[63], In[0], In[1], In[2], In[3], and In[4], in that order. The inputs of each first-stage multiplexer for a bitslice multiplexing structure within the rotator circuit are wired according to Tables I–VIII in the Appendix.

To achieve the desired results, the inputs of the second-stage multiplexer for each bitslice multiplexing structure are also varied by bitslice groups. The second-stage multiplexer inputs are wired differently for rotator output bits [0:7], [8:15], [16:23], [24:31], [32:39], [40:47], (48:55], and [56:63]. For rotator output bitslice group [0:7], the left-most input of second-stage multiplexer MUX OUT is connected to the output of first-stage multiplexer MUX A as depicted in FIGS. 4A and 4B. Similarly, the next MUX OUT input is connected to the output of MUX B, the next MUX OUT input is connected to the output of MUX C, etc. For each consecutive bitslice group, this is rotated by one multiplexer input as shown in Table IX in the Appendix.

Figure 4C:
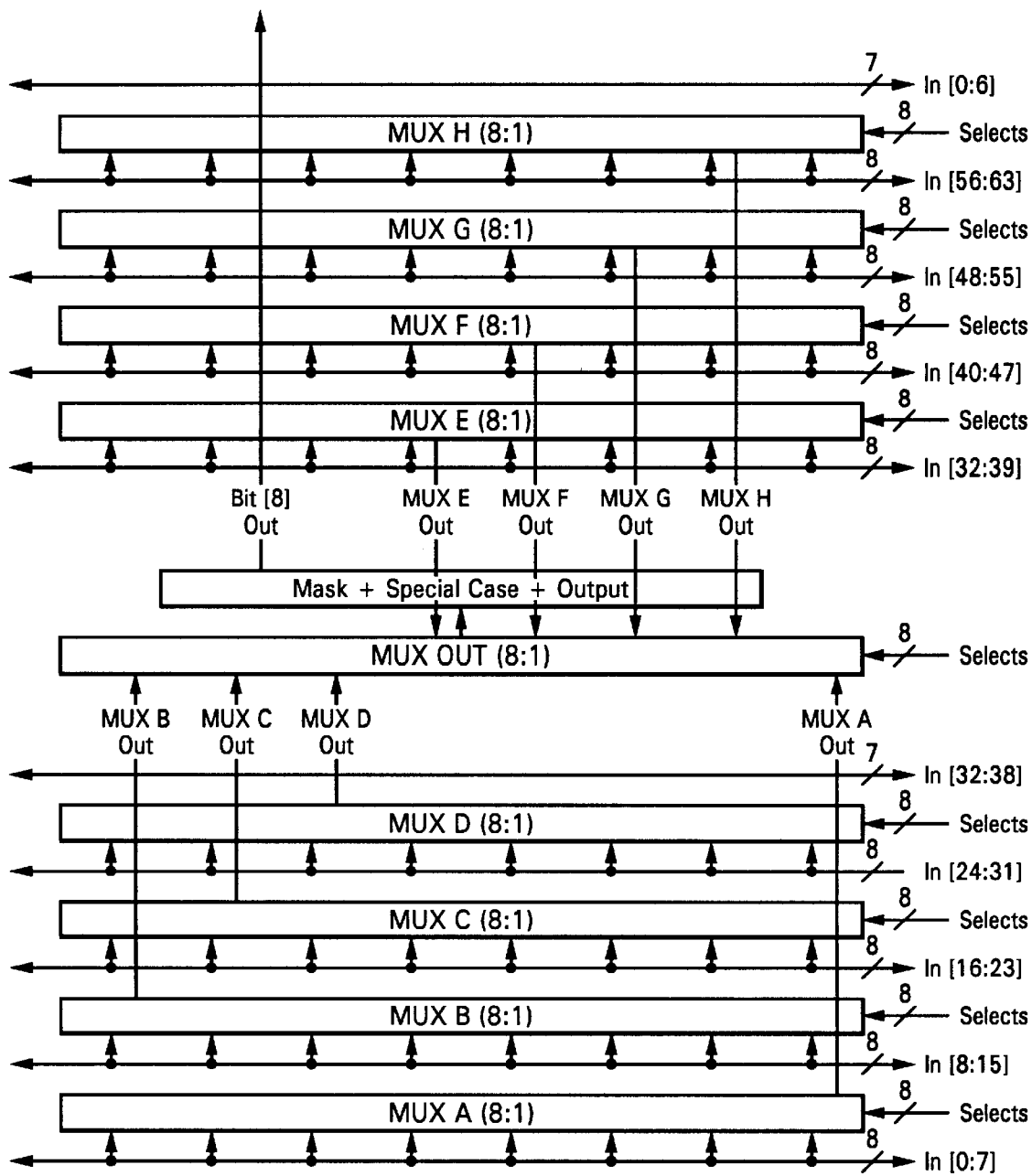

FIG. 4C illustrates, for example, the layout and wiring of a bitslice multiplexing structure for rotator output bit [8]. The left-most input to second-stage multiplexer MUX OUT is connected to the output of MUX:B, the next input is connected to the output of MUX C, and so forth, with the output of MUX A being connected to the last, right-most input. Another view is that MUX A has been rotated up one position within the multiplexing structure; rather than being connected to input bits [0:7] as for rotator output bit [0], MUX A (labeled MUX B in the diagram of FIG. 4C) is instead connected to inputs bits [8:15] for rotator output bit [8]. However, regardless of whether achieved by varying the second-stage input connections or by changing the naming for the first-stage multiplexers, the functional result is the same.

Figure 4D:
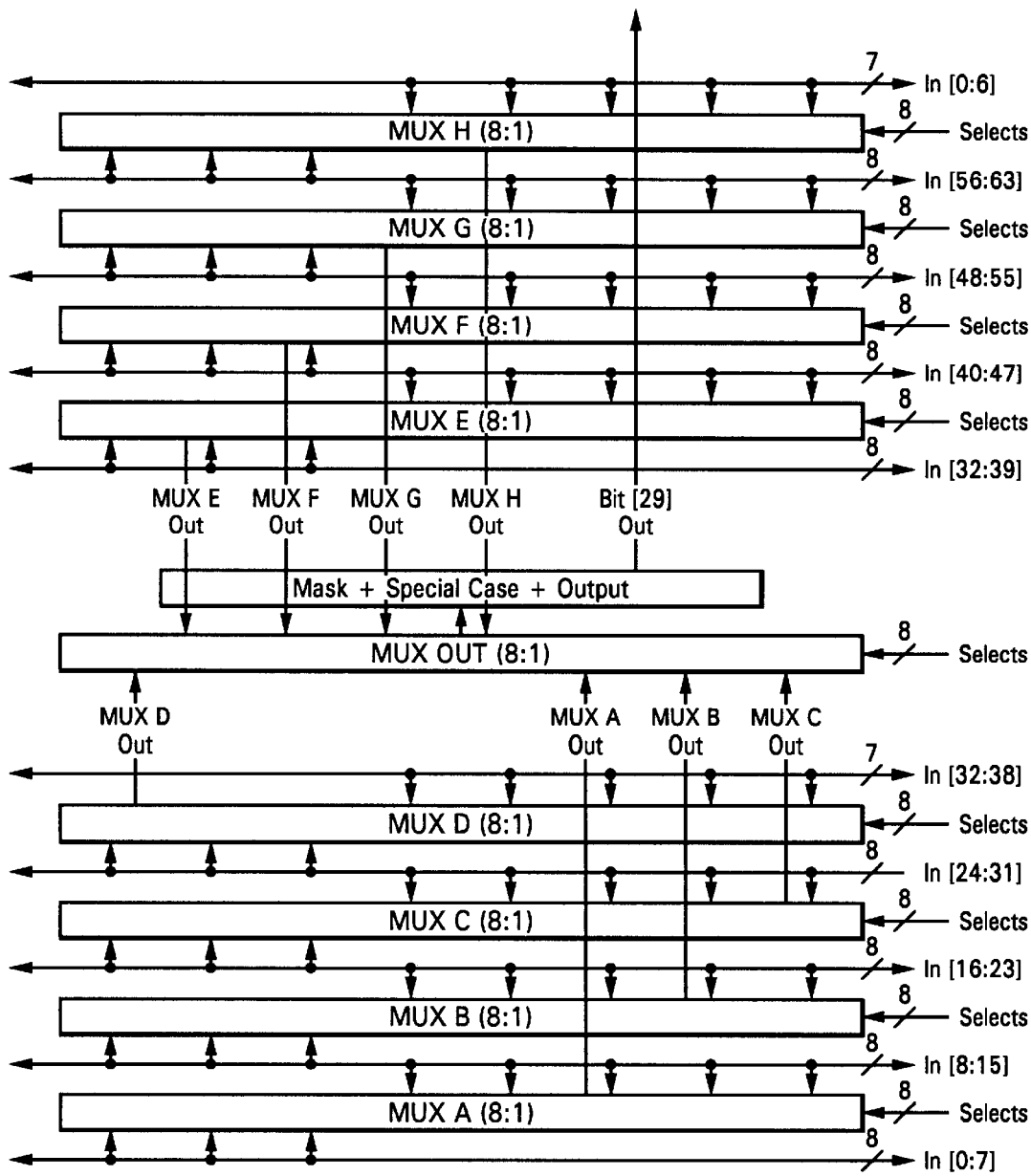

The input wiring for second-stage multiplexer MUX OUT is varied by bitslice group, while the input wiring for the first-stage multiplexers are varied by bitslice within a bitslice group. FIG. 4D illustrates the bitslice multiplexing structure for rotator output bit [29]. The input wiring connections for each first and second-stage multiplexer is defined in Tables I–IX, which cover all permutations of input wiring required for a 64-bit rotator circuit in accordance with the invention.

Figure 4E:
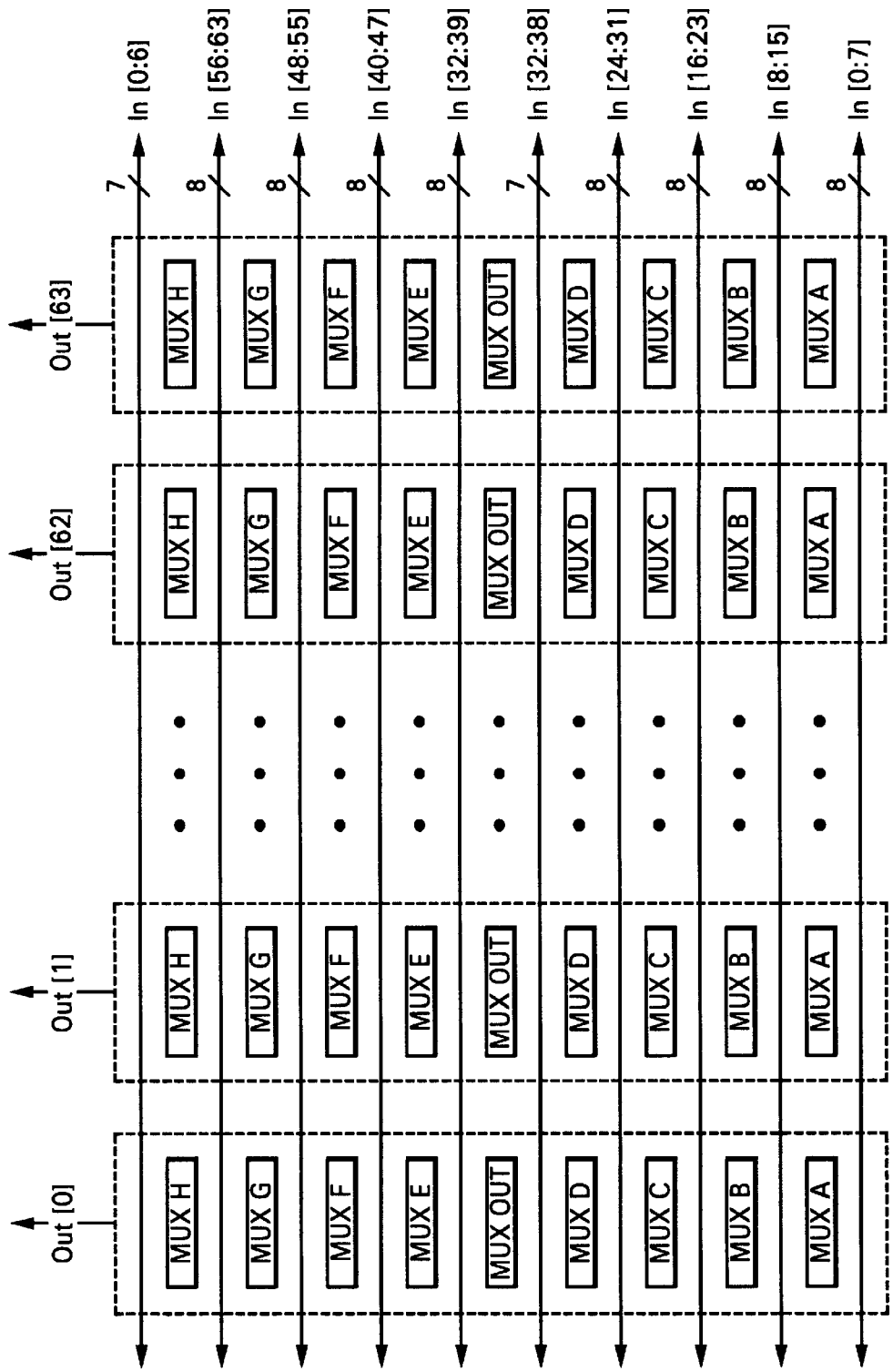
Figure 5:
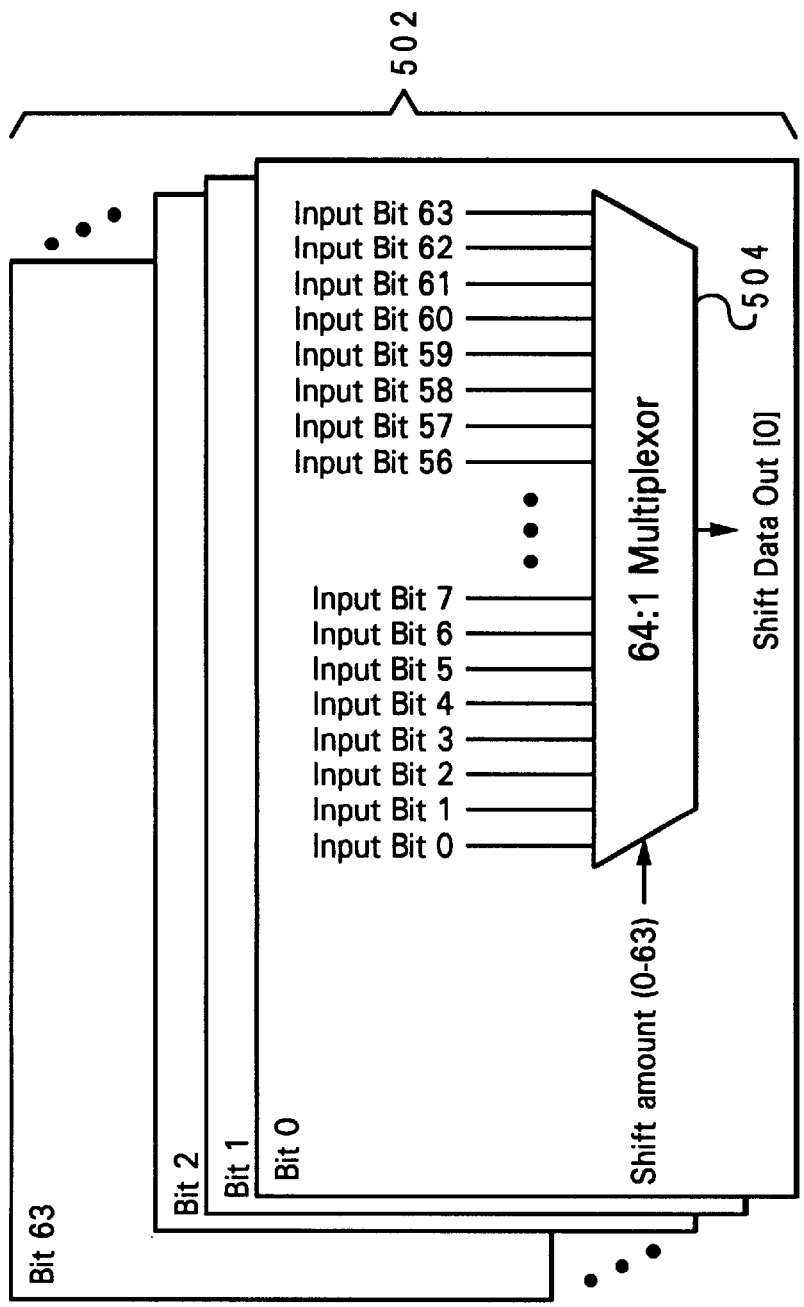
FIG. 5 depicts a diagram of a prior art rotator structure.

The individual bitslice multiplexing structures are combined to form a complete rotator circuit, as illustrated in FIG. 4E. The input buses may run across all individual bitslice multiplexing structures. The outputs of the 64 individual bitslice multiplexing structures combined to form the output of the rotator circuit. The individual bitslice multiplexing structures differ only in the internal wiring of the first and second-stage multiplexers, as described above.

The architectural translations for each individual bitslice multiplexing structure necessary to achieve the correct functionality are very efficient in terms of internal wiring, providing the best overall use of circuit area. For these reasons, the wiring solution of the present invention is both area-efficient and significantly improves overall circuit performance.

The present invention minimizes the required wiring for the 64 input signals required by the 64-bit rotator circuit. The present invention also represents an aggressive methodology for providing a high-performance, low area solution, allowing the rotator circuit to be designed for an acceptable aspect ratio and proper functionality while meeting the very restrictive limitation of no more than twelve wires in the vertical direction at any horizontal point in the circuit. For these reasons, the rotator circuit architecture of the present invention has circuit timing and area benefits above those normally available for implementations of rotator circuits.

While the invention has been particularly shown and described with reference to a preferred embodiment, it will be understood by those skilled in the art that various changes in form and detail may be made therein without departing from the spirit and scope of the invention.

APPENDIX

TABLE I

Bitslices 0, 8, 16, 24, 32, 40, 48, and 56

Data Inputs for Each Multiplexer

| MUX | 0 | 1 | 2 | 3 | 4 | 5 | 6 | 7 |
|---|---|---|---|---|---|---|---|---|
| A | 0 | 1 | 2 | 3 | 4 | 5 | 6 | 7 |
| B | 8 | 9 | 10 | 11 | 12 | 13 | 14 | 15 |
| C | 16 | 17 | 18 | 19 | 20 | 21 | 22 | 23 |
| D | 24 | 25 | 26 | 27 | 28 | 29 | 30 | 31 |
| E | 32 | 33 | 34 | 35 | 36 | 37 | 38 | 39 |
| F | 40 | 41 | 42 | 43 | 44 | 45 | 46 | 47 |
| G | 48 | 49 | 50 | 51 | 52 | 53 | 54 | 55 |
| H | 56 | 57 | 58 | 59 | 60 | 61 | 62 | 63 |

TABLE II

Bitslices 1, 9, 17, 25, 33, 41, 49, and 57

Data Inputs for Each Multiplexer

| MUX | 0 | 1 | 2 | 3 | 4 | 5 | 6 | 7 |
|---|---|---|---|---|---|---|---|---|
| A | 1 | 2 | 3 | 4 | 5 | 6 | 7 | 8 |
| B | 9 | 10 | 11 | 12 | 13 | 14 | 15 | 16 |
| C | 17 | 18 | 19 | 20 | 21 | 22 | 23 | 24 |
| D | 25 | 26 | 27 | 28 | 29 | 30 | 31 | 32 |
| E | 33 | 34 | 35 | 36 | 37 | 38 | 39 | 40 |
| F | 41 | 42 | 43 | 44 | 45 | 46 | 47 | 48 |
| G | 49 | 50 | 51 | 52 | 53 | 54 | 55 | 56 |
| H | 57 | 58 | 59 | 60 | 61 | 62 | 63 | 0 |

TABLE III

Bitslices 2, 10, 18, 26, 34, 42, 50, and 58

Data Inputs for Each Multiplexer

| MUX | 0 | 1 | 2 | 3 | 4 | 5 | 6 | 7 |
|---|---|---|---|---|---|---|---|---|
| A | 2 | 3 | 4 | 5 | 6 | 7 | 8 | 9 |
| B | 10 | 11 | 12 | 13 | 14 | 15 | 16 | 17 |
| C | 18 | 19 | 20 | 21 | 22 | 23 | 24 | 25 |
| D | 26 | 27 | 28 | 29 | 30 | 31 | 32 | 33 |
| E | 34 | 35 | 36 | 37 | 38 | 39 | 40 | 41 |
| F | 42 | 43 | 44 | 45 | 46 | 47 | 48 | 49 |
| G | 50 | 51 | 52 | 53 | 54 | 55 | 56 | 57 |
| H | 58 | 59 | 60 | 61 | 62 | 63 | 0 | 1 |

TABLE IV

Bitslices 3, 11, 18, 27, 35, 43, 51, and 59

Data Inputs for Each Multiplexer

| MUX | 0 | 1 | 2 | 3 | 4 | 5 | 6 | 7 |
|---|---|---|---|---|---|---|---|---|
| A | 3 | 4 | 5 | 6 | 7 | 8 | 9 | 10 |
| B | 11 | 12 | 13 | 14 | 15 | 16 | 17 | 18 |
| C | 19 | 20 | 21 | 22 | 23 | 24 | 25 | 26 |
| D | 27 | 28 | 29 | 30 | 31 | 32 | 33 | 34 |
| E | 35 | 36 | 37 | 38 | 39 | 40 | 41 | 42 |
| F | 43 | 44 | 45 | 46 | 47 | 48 | 49 | 50 |
| G | 51 | 52 | 53 | 54 | 55 | 56 | 57 | 58 |
| H | 59 | 60 | 61 | 62 | 63 | 0 | 1 | 2 |

TABLE V

Bitslices 4, 12, 20, 28, 36, 44, 52, and 60

Data Inputs for Each Multiplexer

| MUX | 0 | 1 | 2 | 3 | 4 | 5 | 6 | 7 |
|---|---|---|---|---|---|---|---|---|
| A | 4 | 5 | 6 | 7 | 8 | 9 | 10 | 11 |
| B | 12 | 13 | 14 | 15 | 16 | 17 | 18 | 19 |
| C | 20 | 21 | 22 | 23 | 24 | 25 | 26 | 27 |
| D | 28 | 29 | 30 | 31 | 32 | 33 | 34 | 35 |
| E | 36 | 37 | 38 | 39 | 40 | 41 | 42 | 43 |
| F | 44 | 45 | 46 | 47 | 48 | 49 | 50 | 51 |
| G | 52 | 53 | 54 | 55 | 56 | 57 | 58 | 59 |
| H | 60 | 61 | 62 | 63 | 0 | 1 | 2 | 3 |

TABLE VI

Bitslices 5, 13, 21, 29, 37, 45, 53, and 61

Data Inputs for Each Multiplexer

| MUX | 0 | 1 | 2 | 3 | 4 | 5 | 6 | 7 |
|---|---|---|---|---|---|---|---|---|
| A | 5 | 6 | 7 | 8 | 9 | 10 | 11 | 12 |
| B | 13 | 14 | 15 | 16 | 17 | 18 | 19 | 20 |
| C | 21 | 22 | 23 | 24 | 25 | 26 | 27 | 28 |
| D | 29 | 30 | 31 | 32 | 33 | 34 | 35 | 36 |
| E | 37 | 38 | 39 | 40 | 41 | 42 | 43 | 44 |
| F | 45 | 46 | 47 | 48 | 49 | 50 | 51 | 52 |
| G | 53 | 54 | 55 | 56 | 57 | 58 | 59 | 60 |
| H | 61 | 62 | 63 | 0 | 1 | 2 | 3 | 4 |

TABLE VII

Bitslices 6, 14, 22, 30, 38, 46, 54, and 62

Data Inputs for Each Multiplexer

| MUX | 0 | 1 | 2 | 3 | 4 | 5 | 6 | 7 |
|-----|----|----|----|----|----|----|----|----|
| A | 6 | 7 | 8 | 9 | 10 | 11 | 12 | 13 |
| B | 14 | 15 | 16 | 17 | 18 | 19 | 20 | 21 |
| C | 22 | 23 | 24 | 25 | 26 | 27 | 28 | 29 |
| D | 30 | 31 | 32 | 33 | 34 | 35 | 36 | 37 |
| E | 38 | 39 | 40 | 41 | 42 | 43 | 44 | 45 |
| F | 46 | 47 | 48 | 49 | 50 | 51 | 52 | 53 |
| G | 54 | 55 | 56 | 57 | 58 | 59 | 60 | 61 |
| H | 62 | 63 | 0 | 1 | 2 | 3 | 4 | 5 |

TABLE VIII

Bitslices 7, 15, 23, 31, 39, 47, 55, and 63

Data Inputs for Each Multiplexer

| MUX | 0 | 1 | 2 | 3 | 4 | 5 | 6 | 7 |
|-----|----|----|----|----|----|----|----|----|
| A | 7 | 8 | 9 | 10 | 11 | 12 | 13 | 14 |
| B | 15 | 16 | 17 | 18 | 19 | 20 | 21 | 22 |
| C | 23 | 24 | 25 | 26 | 27 | 28 | 29 | 30 |
| D | 31 | 32 | 33 | 34 | 35 | 36 | 37 | 38 |
| E | 39 | 40 | 41 | 42 | 43 | 44 | 45 | 46 |
| F | 47 | 48 | 49 | 50 | 51 | 52 | 53 | 54 |
| G | 55 | 56 | 57 | 58 | 59 | 60 | 61 | 62 |
| H | 63 | 0 | 1 | 2 | 3 | 4 | 5 | 6 |

TABLE IX

Second Level Mux Connections by Bitslice Group

| Bitslice Group | Second Level Mux Inputs | | | | | | | |
|---|---|---|---|---|---|---|---|---|
| | 0 | 1 | 2 | 3 | 4 | 5 | 6 | 7 |
| [0:7] | A | B | C | D | E | F | G | H |
| [8:15] | B | C | D | E | F | G | H | A |
| [16:23] | C | D | E | F | G | H | A | B |
| [24:31] | D | E | F | G | H | A | B | C |
| [32:39] | E | F | G | H | A | B | C | D |
| [40:47] | F | G | H | A | B | C | D | E |
| [48:55] | G | H | A | B | C | D | E | F |
| [56:63] | H | A | B | C | D | E | F | G |

What is claimed is:

1. A method of efficiently wiring a rotator, comprising:
forming a bitslice multiplexing structure by:
alternating a plurality of first-stage multiplexers each having a plurality of inputs with a plurality of input buses;
for every first-stage multiplexer, connecting every input to a different input conductor within an input bus adjacent to that first-stage multiplexer;
connecting an output of each first-stage multiplexer to an input of a second-stage multiplexer, wherein selects for at least one first-stage multiplexer and the second-stage multiplexer are employed to connect an input conductor within the input buses to a rotator output; and
replicating the bitslice multiplexing structure with different internal wiring for each rotator output.

2. The method of claim 1, further comprising:
positioning the second-stage multiplexer within the alternating input buses and first-stage multiplexers.

3. The method of claim 2, wherein the step of alternating a plurality of first-stage multiplexers each having a plurality of inputs with a plurality of input buses further comprises:
positioning a first-stage multiplexer between two input buses including every input conductor to which an input for the first-stage multiplexer may be connected.

4. The method of claim 3, wherein the step of connecting every input to a different input conductor within an input bus adjacent to that first-stage multiplexer further comprises:
rotating an order of connection of the first-stage multiplexer inputs to input conductors within adjacent input buses for each successive bitslice multiplexing structure within the rotator.

5. The method of claim 4, wherein the step of rotating an order of connection of the first-stage multiplexer inputs to input conductors within adjacent input buses for each successive bitslice multiplexing structure within the rotator further comprises:
connecting a first input for a first first-stage multiplexer within a first bitslice multiplexing structure to a first input conductor; and
connecting an nth input for a first first-stage multiplexer within an nth bitslice multiplexing structure to an nth input conductor, wherein the first first-stage multiplexer within the nth bitslice multiplexing structure corresponds to the first first-stage multiplexer within the first bitslice multiplexing structure.

6. The method of claim 4, wherein the step of connecting an output of each first-stage multiplexer to an input of a second-stage multiplexer further comprises:
logically dividing the bitslice multiplexing structures within the rotator into a plurality of groups; and
rotating an order of connection of the first-stage multiplexer outputs to the inputs of the second-stage multiplexer for each successive bitslice multiplexing structure group within the rotator.

7. The method of claim 6, wherein the step of rotating an order of connection of the first-stage multiplexer outputs to the inputs of the second-stage multiplexer for each successive bitslice multiplexing structure group within the rotator further comprises:
connecting an output of a first first-stage multiplexer to a first input of a second-stage multiplexer for each bitslice multiplexing structure within a first group; and
connecting an output of an nth first-stage multiplexer to a first input of a second-stage multiplexer for each bitslice multiplexing structure within an nth group.

8. A rotator, comprising:
a plurality of bitslice multiplexing structures, each bitslice multiplexing structure including:
a plurality of first-stage multiplexers each having a plurality of inputs alternated with a plurality of input buses, wherein, for every first-stage multiplexer, every input is connected to a different input conductor within an input bus adjacent to that first-stage multiplexer; and
a second-stage multiplexer having a plurality of inputs each connected to an output of a different first-stage multiplexer,
wherein selects for at least one first-stage multiplexer and the second-stage multiplexer are employed to connect an input conductor within the input buses to a rotator output,
wherein each bitslice multiplexing structure includes different internal wiring.

9. The rotator of claim 8, wherein the second-stage multiplexer is positioned within the alternating input buses and first-stage multiplexers.

10. The rotator of claim 9, wherein each first-stage multiplexer is positioned between two input buses including every input conductor to which an input for the respective first-stage multiplexer may be connected.

11. The rotator of claim 10, wherein an order of connection of the first-stage multiplexer inputs to input conductors within adjacent input buses is rotated for each successive bitslice multiplexing structure within the rotator.

12. The rotator of claim 11, wherein:
a first input for a first first-stage multiplexer within a first bitslice multiplexing structure is connected to a first input conductor; and
an nth input for a first first-stage multiplexer within an nth bitslice multiplexing structure is connected to an nth input conductor, wherein the first first-stage multiplexer within the nth bitslice multiplexing structure corresponds to the first first-stage multiplexer within the first bitslice multiplexing structure.

13. The rotator of claim 12, wherein the bitslice multiplexing structures within the rotator are logically divided into a plurality of groups, and an order of connection of the first-stage multiplexer outputs to the inputs of the second-stage multiplexer is rotated for each successive bitslice multiplexing structure group within the rotator.

14. The rotator of claim 13, wherein:
an output of a first first-stage multiplexer is connected to a first input of a second-stage multiplexer for each bitslice multiplexing structure within a first group; and
an output of an nth first-stage multiplexer is connected to a first input of a second-stage multiplexer for each bitslice multiplexing structure within an nth group.

15. A rotator, comprising:
a plurality of bitslice multiplexing structures each generating a rotator output, each bitslice multiplexing structure including:
a plurality of first-stage multiplexers each having a plurality of inputs, each first-stage multiplexer positioned between two input buses including every rotator input which may be connected to an input of the respective first-stage multiplexer, each input of the first-stage multiplexer connected in successive order to a different input conductor within an input bus adjacent to the respective first-stage multiplexer;
a second-stage multiplexer having a plurality of inputs each connected to an output of a different first-stage multiplexer, the second-stage multiplexer positioned between two groups of first-stage multiplexers,
wherein each successive bitslice multiplexing structure within the rotator has a different order of connections between the first-stage multiplexer inputs and input conductors within the input buses and a different order of connections of the first-stage multiplexer outputs to the second-stage multiplexer inputs.

16. The rotator of claim 15, wherein, within each bitslice multiplexing structure, a first input for a first-stage multiplexer connected to a first input of the second-stage multiplexer is connected to an input conductor within the input buses corresponding to rotator output which the respective bitslice multiplexing structure generates.

17. The rotator of claim 16, wherein a first input for a first-stage multiplexer connected to a first input of the second-stage multiplexer within a bitslice multiplexing structure generating a fifth rotator output is connected to a fifth input conductor within the input buses.

18. The rotator of claim 17, further comprising:
eight 8:1 first-stage multiplexers within each bitslice multiplexing structure; and
one 8:1 second-stage multiplexer within each bitslice multiplexing structure, the second-stage multiplexer having inputs each connected to a different one of the eight first-stage multiplexers and an output coupled to the corresponding rotator output for the respective bitslice multiplexing structure.

19. The rotator of claim 15, further comprising:
sixty-four bitslice multiplexing structures forming a 64-bit rotator capable of rotating an operand from 0 to 63 bits.

* * * * *